United States Patent [19]

Kishi et al.

[11] Patent Number: 5,199,084
[45] Date of Patent: Mar. 30, 1993

[54] APPARATUS AND METHOD FOR LOCATING CHARACTERS ON A LABEL

[75] Inventors: Gregory T. Kishi; Michael P. McIntosh, both of Tucson, Ariz.

[73] Assignee: International Business Machines Corporation, Armonk, N.Y.

[21] Appl. No.: 745,651

[22] Filed: Aug. 16, 1991

[51] Int. Cl.⁵ .............................................. G06K 9/36
[52] U.S. Cl. ........................................ 382/48; 382/61; 209/583
[58] Field of Search .......................... 382/48, 61, 9, 1; 235/454, 463; 209/583, 584

[56] References Cited

U.S. PATENT DOCUMENTS

| | | | |
|---|---|---|---|
| 3,058,093 | 10/1962 | Vernon et al. | 382/48 |
| 3,200,373 | 8/1965 | Rainbow | 382/48 |
| 3,801,775 | 4/1974 | Acker | 382/61 |
| 3,852,715 | 12/1974 | Morimoto | 382/61 |
| 4,516,265 | 5/1985 | Kizu et al. | 382/48 |
| 4,736,109 | 4/1988 | Dvorzsak | 382/48 |
| 4,760,247 | 7/1988 | Keane et al. | 382/61 |
| 4,809,344 | 2/1989 | Peppers et al. | 382/32 |
| 4,822,986 | 4/1989 | Guthmueller et al. | 235/462 |
| 4,855,981 | 8/1989 | Kimura et al. | 369/44 |
| 4,916,298 | 4/1990 | Raphael | 235/463 |
| 4,926,492 | 5/1990 | Tanaka et al. | 382/18 |
| 4,948,955 | 8/1990 | Lee et al. | 235/462 |

Primary Examiner—Leo H. Boudreau
Assistant Examiner—David Fox
Attorney, Agent, or Firm—M. W. Schecter

[57] ABSTRACT

Locating and recognizing characters on a machine produced label, for example, is accomplished faster and more accurately by searching for first and second identifiable objects within first and second search windows, respectively. The first and second search windows are typically much smaller than the label or image being searched. The first object is the top portion of the label and the second object is the bottom portion of the label. Having located each object, a reference point is determined on each. From these two reference points, precise character or bar code locations can be predicted for reading the characters or bar codes printed on the label at predetermined locations. A character search window superimposed over each character at its estimated location is searched to read the character located thereat. If the first or second object could not be located, due to a torn label for example, an alternate object may be searched and a reference point located thereon.

18 Claims, 5 Drawing Sheets

APPARATUS AND METHOD FOR LOCATING CHARACTERS ON A LABEL

FIELD OF THE INVENTION

This invention relates generally to the field of machine vision systems and more particularly, to a machine vision system for quickly finding optically recognizable characters printed on a label by first finding label reference points and calculating the character positions therefrom.

BACKGROUND OF THE INVENTION

Computers, in performing many tasks previously accomplished by humans, are required to optically recognize objects or codes. Machine vision systems, therefore, are coupled to computers for performing recognition functions. Optical character recognition (OCR) software, for example, is used to drive a scanner for scanning a page of text. Characters recognized on the scanned page are electronically transferred to the computer×s memory, thereby relieving a data input operator from manually inputting the document contents. Another common function for machine vision systems is scanning items having bar codes impressed thereon. The bar code is more easily recognized than alphanumeric characters and may therefore be useable in harsher environments. Bar codes, for example, are optically read from packages for inputting price and product description information into a computer.

More sophisticated systems merge a robot with a machine vision system, for example, a camera located on a robotic arm, the camera and robotic arm being controlled by a processing unit. The machine vision system can be taught to recognize certain objects so that the robot can grip and manipulate the identified objects. In automated data storage libraries, a robotic arm is directed to a slot storing a cartridge containing a data storage medium, i.e., a magnetic tape or optical disk. A camera located on the robotic arm, attempts to read alpha-numeric characters or bar code impressed on a label attached to the cartridge to identify the cartridge or verify the cartridge being picked by the robotic arm is the expected cartridge.

In the above described machine vision systems, the characters or bar code must first be located. Once located, the characters or bar code must be read. For a machine vision system to operate efficiently, it must locate the characters or bar code quickly and read the characters or bar code accurately. Locating characters or objects, for example, typically requires searching a large image or area, i.e., a page, a package, a label, or everything within a camera's field of vision. The time required to locate the characters or objects is related to the image size or area to be searched. Once the characters are located, a smaller search window is viewed in an attempt to identify individual characters. An erroneous character reading may occur when a character is not fully within a search window, or when more than one character appears in the search window.

A method for improving OCR efficiency is taught by Tanaka, et al., in U.S. Pat. No. 4,926,492. This invention searches an image, i.e., a page, and divides the image into character lines. Picture elements are then counted in several different directions for determining character positions. In Tanaka, et al., a large image must still be searched, and each individual character location must be determined within a window though the character line information is used to reduce the window size somewhat. Peppers, et al., in U.S. Pat. No. 4,809,344, describe segmenting a page by simultaneously identifying multiple features including separation between lines and separation between characters. A page having both vertical and horizontal text would be segmented so that each segment could be handled more efficiently. Like Tanaka, et al., this implementation still requires searching a large image for recognizable characters.

A method for locating bar codes, even on an image having background noise, is described by Raphael in U.S. Pat. No. 4,916,298. The bar codes are detected by comparing areas of the image to a predetermined threshold (indicating light reflection or absorption). Once a suspected bar code is located, a smaller image area or window surrounding the bar code is viewed in an attempt to read the bar code. Raphael provides a faster method for finding bar codes but still teaches first scanning an entire image and then windows within that image. Guthmueller, et al., in U.S. Pat. No. 4,822,986 takes advantage of the knowledge that postal zip codes printed on envelopes as bar codes will be printed near the envelope bottom. Guthmueller, et al., only searches the bottom portion of the envelope when locating the bar codes. Efficiency is improved by reducing the image area being searched. Finding the bar codes is then accomplished by recognizing the bar code image.

Another method of reducing the time required to locate regions of an image containing bar codes is set forth by Lee, et al., in U.S. Pat. No. 4,948,955. This method first reduces the background image, then rejects background noise while attempting to locate a bar code. Once the bar code is found, the four corner points defining the bar code's boundary are determined. Like the other prior art, this invention requires searching a relatively large image area while trying to identify characters or bar code, sometimes in the presence of background noise.

Machine identifiable characters or bar codes are often printed on a page or label at predetermined locations. Substantial processing time may be saved by quickly identifying easily recognizable objects for establishing reference points, and then determining where the identifying characters or bar codes are located. The need for scanning an image for recognizable characters in the presence of noise would no longer be required.

Thus what is needed is a machine vision system for quickly finding easily recognizable objects for establishing reference points from which actual character or bar code locations may be predicted.

SUMMARY OF THE INVENTION

Accordingly, it is an object of the present invention to provide an improved machine vision system for finding character locations within an image.

Another object of the present invention is to provide an improved method of locating reference points on an object for calculating character locations therefrom.

Yet another object of the present invention is to provide a method of reducing the size of character search windows when reading characters in a machine vision system.

These and other objects of this invention are accomplished by a method for efficiently locating an optically recognizable character encoded on a label, comprising the machine-executed steps of locating the label and searching a first predetermined window for identifying a first predetermined object. After the first predetermined object is identified, a first reference mark position on the first predetermined object is created. Next searching a second predetermined window for identifying a second predetermined object. After the second predetermined object is identified, a second reference mark position on the second predetermined object is created. A first character window location is calculated, wherein the location is relative to the first and second reference mark positions. Lastly, a first character located within the first character window is read. Characters are thus located quickly by searching two smaller predetermined windows for locating more easily identifiable objects and predicting the character locations therefrom.

The foregoing and other objects, features and advantages of the invention will be apparent from the following more particular description of the preferred embodiment of the invention, as illustrated in the accompanying drawing.

DESCRIPTION OF THE PREFERRED EMBODIMENT

Figure 1:
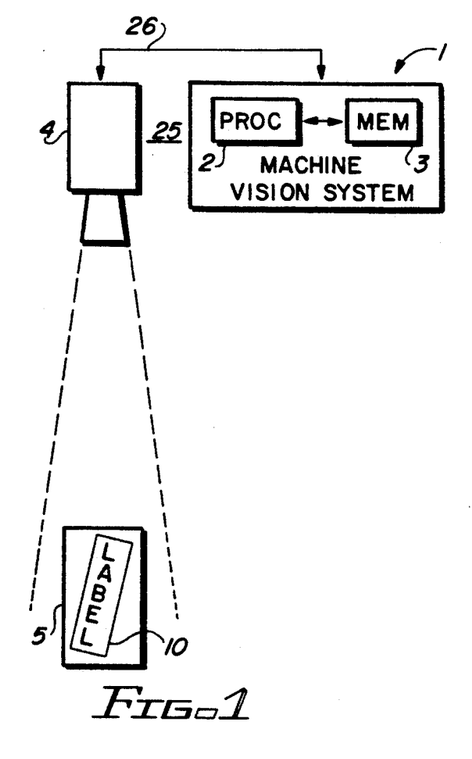
FIG. 1 is a block diagram of a machine vision system for carrying out the present invention.

FIG. 1 is a block diagram of a robotic system 25 having a machine vision system 1 connected to a camera 4 via a robotic arm 26. The robotic arm 26 moves the camera 4 to predetermined locations, for example, to different storage slots in an automated tape library. The camera 4 will then be able to view an article, for example, a tape cartridge 5 stored in a storage slot (not shown). The tape cartridge 5 has a label 10 attached thereto which identifies the tape cartridge 5. The label 10 is shown in more detail in FIG. 2. The robotic system 25 is able to view the label 10 on the cartridge 5 and read identifying characters printed on the label 10 thereby verifying the cartridge 5 as the expected cartridge.

The machine vision system 1 further includes a memory 3 connected to a processor 2. The memory 3 could comprise an electronic memory such as dynamic access random memory (DRAM), a direct access storage device (DASD), a floppy disk, or some combination thereof. A computer program, in computer readable form, is stored in the memory 3 for instructing the processor 2. The computer program, for example, performs auto-normalized correlation techniques for finding features of the label 10 and the characters printed thereon. An example of a machine vision system 1 is the COGNEX MODEL 2000.

Figure 2:
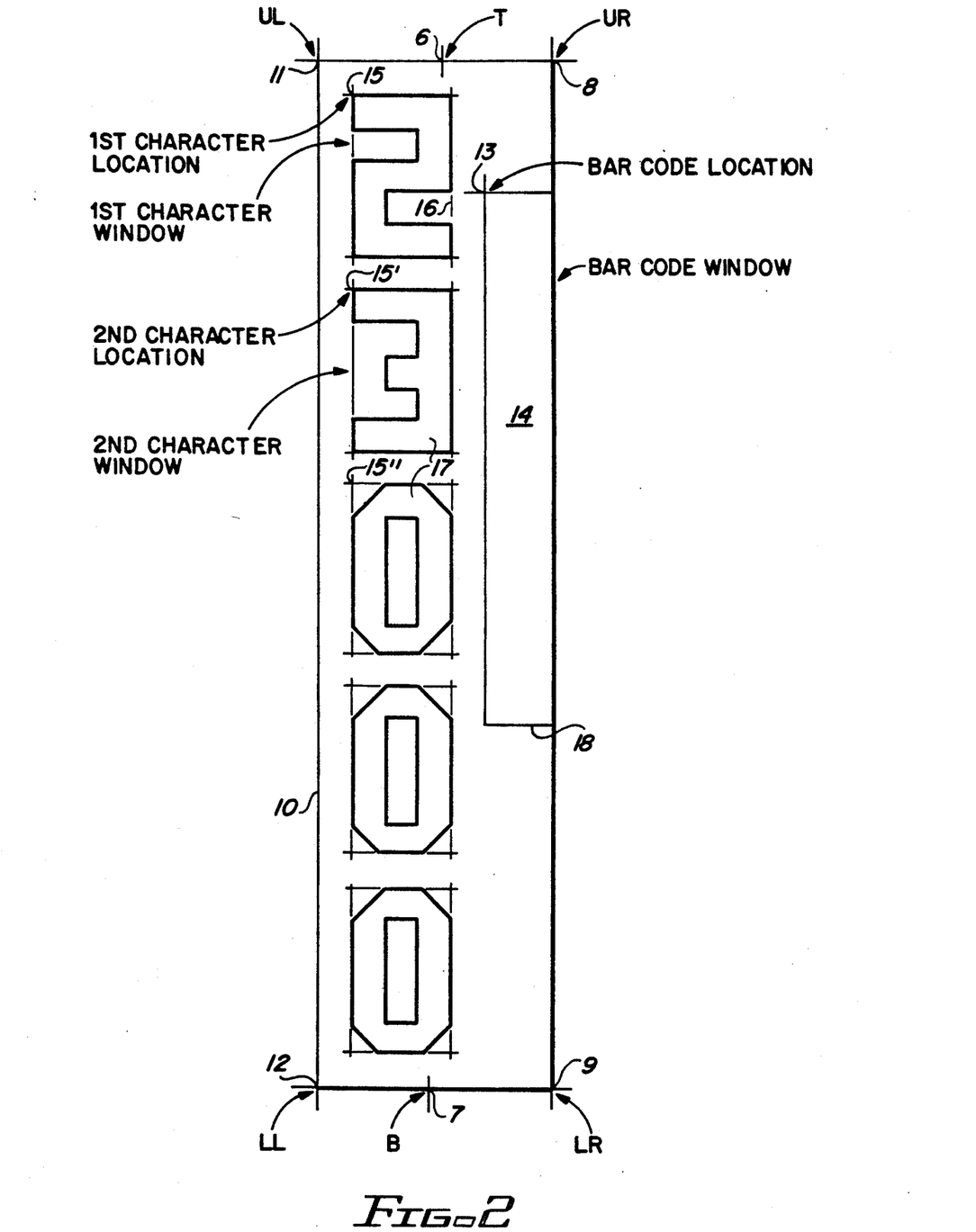
FIG. 2 is a pictorial diagram of a label having identified reference points and character and bar code locations.

Referring now to FIG. 2, the label 10 is shown with character and reference point details. According to the present invention, the label 10 includes a plurality of optically recognizable characters 17 and/or bar codes 14. The label 10 is machine manufactured such that the label 10's size and shape is accurately reproducible. Furthermore, the plurality of characters 17 and/or bar codes 14 are printed on the label 10 in predetermined and accurately reproducible locations. The characters 17 and bar codes 14 also have predetermined sizes. Therefore, a first character location 15 will be at substantially the same location on each label. Also, a first character search window 16 will have substantially the same size for each character from label to label. Similarly, a bar code location 13 and a bar code window 18 will be the same from label to label.

Locating and reading characters and bar codes from the label 10 can be substantially improved by taking advantage of the consistent placement and size of the characters 17 and bar codes 14. When a character's location can be accurately predicted, i.e., calculated from label reference points, a character recognition algorithm may operate much faster because a large image area need not be searched. The character's location includes both coordinate and orientation information. The character recognition algorithm may also operate more accurately because each character search window contains only the character being searched, i.e., there are no additional characters in the search window.

Three sets of reference points are defined on the label 10 as shown in FIG. 2. The first two reference points, T and B, are located at top center and bottom center positions, respectively. A second set of reference points, UR and LR, are located at the label 10's upper right and lower right corners, respectively. Reference points UL and LL are located at the label 10's upper left and lower left corners, respectively. Having defined any one set of the reference points, the first character location 15 (or a second character location 15', etc.) or the bar code location 13 can be quickly predicted as being a known distance from the defined reference points. Furthermore, the reference points T, B, UR, LR, UL, and LL can be quickly determined by finding an easily identifiable object (a portion of the label 10) in a relatively small search window.

Figure 3:
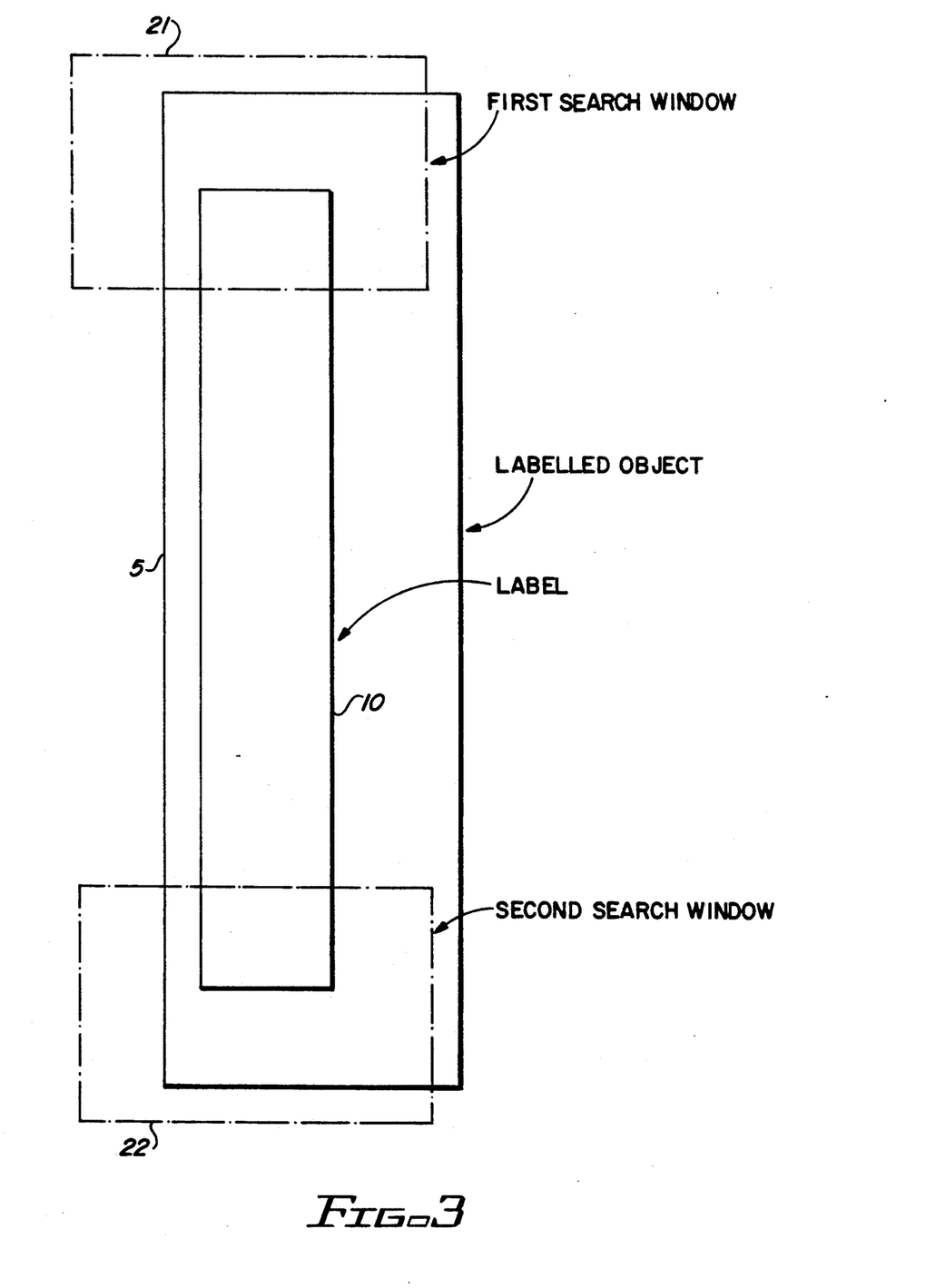
FIG. 3 is a pictorial diagram of first and second search windows used for locating reference points on the label.
Figure 4A:
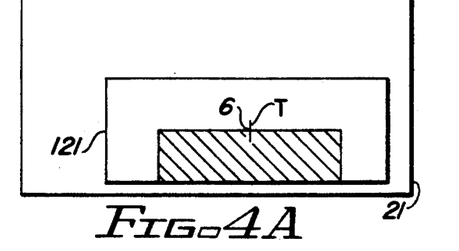
FIGS. 4A-4F are pictorial diagrams of a plurality of predetermined images searched by the machine vision system according to the present invention.
Figure 4B:
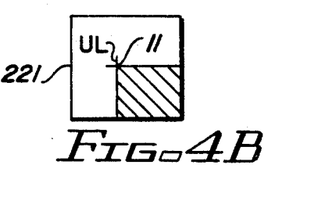
Figure 4C:
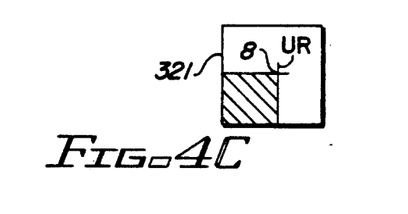
Figure 4D:
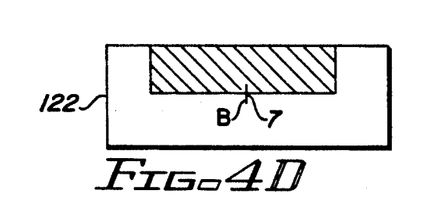
Figure 4E:
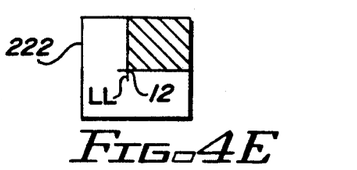
Figure 4F:
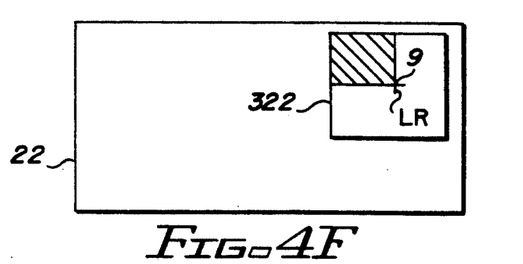

FIG. 3 depicts the cartridge 5 having the label 10 attached thereto, wherein the robotic system 25 searches for an object 121 (see FIG. 4A) in a search window 21 and for an object 122 (see FIG. 4D) in a search window 22. The first and second search windows 21 and 22 are predefined within the camera 4 image (full view of the camera 4), and are somewhat larger than the top and bottom label 10 portions, respectively. The robotic system 25, therefore, has only a small image area to search, thereby making the search more efficient than having to search the entire label 10. Additionally, the objects being searched are easy to identify and can be quickly found. FIGS. 4A-4C show the objects 121, 221, and 321 that are searched in the search window 21 and FIGS. 4D-4F show the objects 122, 222, and 322 that would be searched in the search window 22.

The label 10 top portion is searched in the search window 21 for the object 121 to define the reference point T. The object 121 is easily found by the robotic system 25 thereby making the search very efficient. Once found, the reference point T can be calculated as centered at the label 10 top. If the label 10 is attached to the cartridge 5 somewhat skewed, or if the cartridge 5 sets in the cartridge slot at an angle, the object 121 in the search window 21 will be slightly skewed. The robotic system 25 has the ability to recognize a skewed image and accurately calculate the associated reference point. Therefore, when two reference points are calculated, and a character or bar code location is predicted therefrom, orientation information is available. Assuming the reference point T is calculated, the robotic system 25 next searches in the search window 22 for the label 10 bottom portion object 122 to calculate the reference point B located at the bottom center thereof. The top or bottom portion of the label 10 may not be located, however, if the label 10 is damaged. A failure to find the top and/or bottom portion will cause the robotic system 25 to search for a second set of objects, i.e., the upper right and lower right corner label 10 portions for defining the UR and LR reference points, respectively, as depicted in FIGS. 4C and 4F. The robotic system 25 will search for upper left and lower left corner label 10 portions for defining reference points UL and LL, respectively, as shown in FIGS. 4B and 4E, if the second set of objects, 321 and 322, were not found.

Figure 5A:
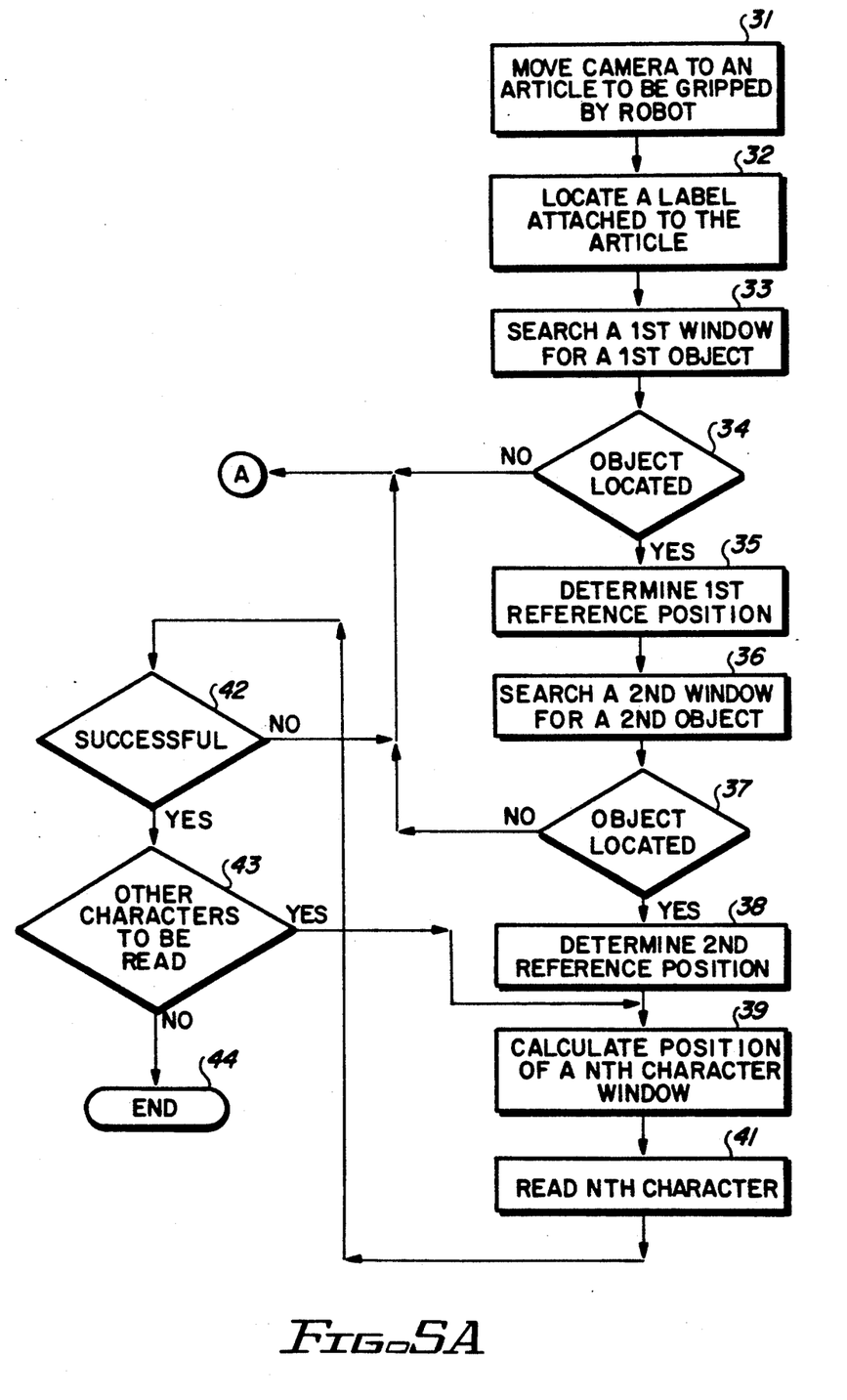
FIGS. 5A and 5B are flow chart diagrams of the method according to the present invention.
Figure 5B:
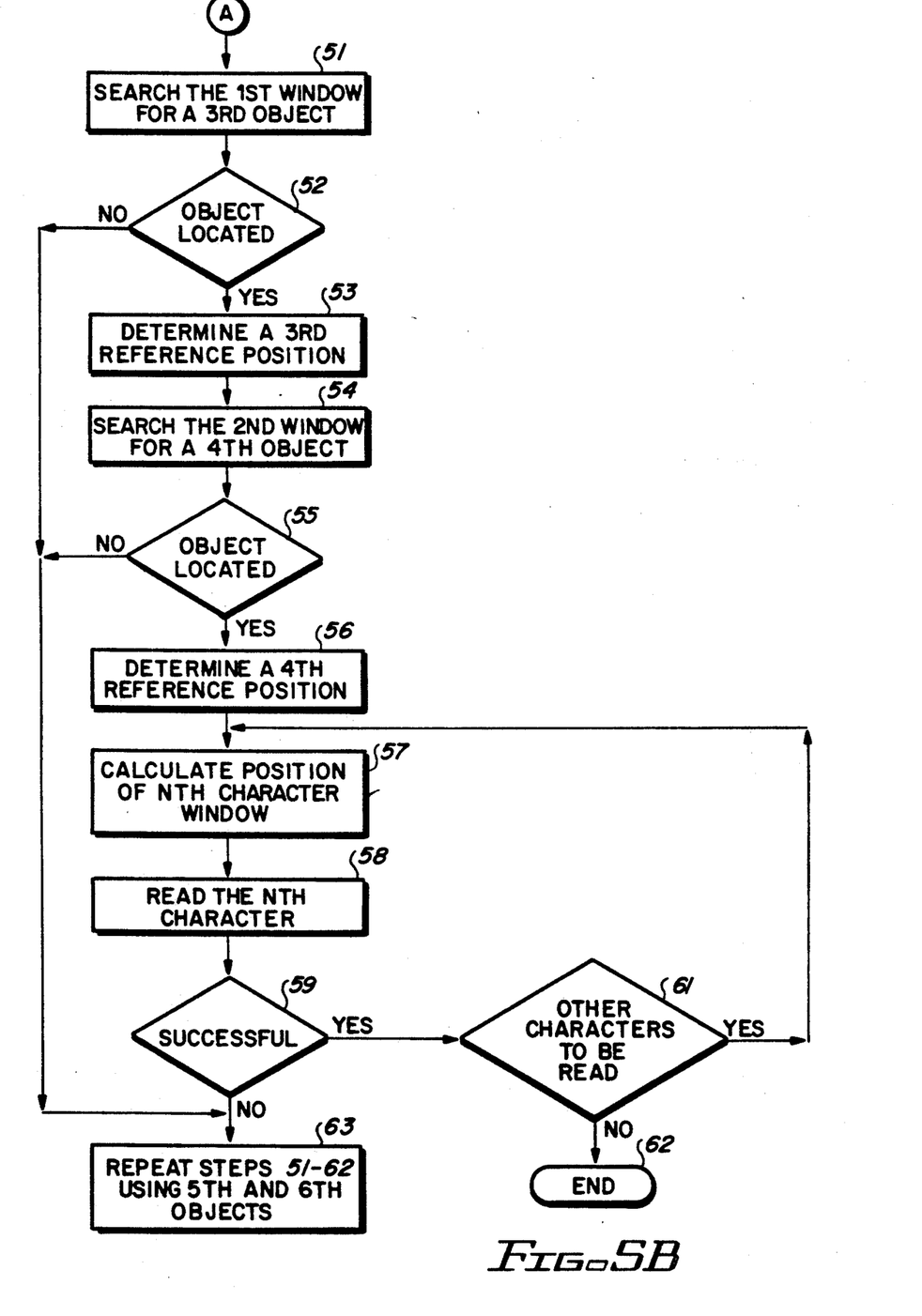

FIGS. 5A and 5B diagram the sequence of steps performed by the robotic system 25 in more detail as controlled by the computer program stored in the memory 3. The sequence begins with step 31 wherein the robotic arm 26 positions the camera 4 in front of a predetermined storage slot for retrieving the cartridge 5 stored therein. In step 32 the processor 2 acquires an image from the camera 4 by digitizing its video signal into the memory 3. Having acquired the image containing the label 10, the processor 2 searches in the search window 21 for the object 121 of the label 10 in step 33 as depicted by FIG. 4A. If the label 10 top portion is located, step 34 directs control to step 35 to determine a first reference point. If the label 10 top portion was not located, step 34 directs control to a step 51 to search for an alternate object. The label 10 top portion might not be successfully located, for example, if the label is torn or dirty. An additional advantage of searching for the label 10 top portion is its easy identity in the current application, i.e., a white rectangular image against a black background (assuming a white label on a black cartridge).

Step 35 includes determining a first reference position on the located label 10 top portion. Given the object 121 is located and that its dimensions are known, the processor 2 can locate the top center position, or T. The second search window 22 is searched in step 36 for the object 122. The object 122 is the label 10 lower portion as depicted in FIG. 4D. If the object 122 is found, step 37 passes control to step 38 for determining the second reference position B. If the object 122 is not located, for example, due to a torn or missing label, control is directed to step 51. Having successfully determined first and second reference positions at T and B, respectively, the first character or bar code location can be accurately predicted in step 39. Referring to FIG. 2, character location 15 would be calculated relative to T and B. Because the characters have a predetermined size, a character search window 16 can be superimposed upon the character located at the character location 15 wherein the character search window 16 size is approximately equal to the character located there.

The character at the character location 15 is read in step 41 by searching the character search window 16. The character read step 41 is both efficient and accurate since the search is limited to a small character search window, and only one character could exist within the character search window 16. A failure to read a recognizable character in step 41 causes step 42 to direct control to the step 51 for attempting to make another character location estimation. Otherwise, step 43 determines whether there are other characters 17 or bar codes 14 to be read. Additional character or bar code locations are again calculated in step 39 using the earlier determined T and B reference point information. After estimating each additional character location, the character located thereat is read in step 41. When all expected characters or bar code are successfully read, the sequence ends at step 44. The robotic system 25 may then verify the cartridge located in the current storage slot.

If the object 121 or the object 122 was not identified, or if a character 17 was not recognizable, control is transferred to the step 51 for attempting to identify an alternate object. The robotic system 25 searches the search window 21 for the object 321 which is the upper right corner of label 10 as shown in FIG. 4C. If the object 321 is not located, yet another alternate object may be sought in step 63, such as the upper left corner of the label 10 as shown in FIG. 4B. Otherwise a decision is made at step 52 to continue forward to step 53 for determining a third reference position (first and/or second reference positions may or may not have previously been determined depending upon prior events). The third reference position, according to the present example, is UR.

Step 54 involves searching in the second search window 22 for the object 322, i.e., the lower right corner of the label 10. If the object 322 cannot be found, step 63 is invoked by decision step 55. Step 63 actually represents a series of steps similar to steps 51 through 62 but searching for the objects 221 and 222 instead. If either object 221 or 222 cannot be found in step 63, the processor 2 may chose to report the label as missing. However, if the object 322 image was successfully located, step 55 will invoke step 56 for determining a fourth reference location, i.e., LR. A Nth character position, relative to the third and fourth reference positions UR and LR, is estimated in step 57. The Nth character is then read in step 58. If the Nth character was successfully read, steps 59 and 61 cause steps 57 and 58 to be repeated until all characters (or bar codes) have been successfully read. If a Nth character was not successfully read, step 59 causes step 63 to be executed.

While the invention has been particularly described with reference to particular embodiments thereof, it will be understood by those skilled in the art that various other changes in detail may be made therein without departing from the spirit, scope, and teaching of the invention. The invention is not limited to robotic vision systems, but is applicable to vision systems reading characters from an image. The object, furthermore is not limited to label portions, but may include a variety of reproducible objects.

What is claimed is:

1. A method for efficiently locating an optically recognizable character encoded on a label, comprising machine-executed steps of:
    locating the label;
    searching in a first predetermined window for identifying a first predetermined object;
    determining a first reference mark position on the first predetermined object;
    searching in a second predetermined window for identifying a second predetermined object;

determining a second reference mark position on the second predetermined object;

calculating a first character window location relative to the first and second reference mark positions;

reading a first character located within the first character window; and if the reading step failed:

searching the first predetermined window for identifying a third predetermined object;

determining a third reference mark position on the third predetermined object;

searching the second predetermined window for identifying a fourth predetermined object;

determining a fourth reference mark position on the fourth predetermined object;

calculating the location of the first character window, the location being relative to the third and fourth reference mark positions; and reading the first character located within the first character window.

2. A method of efficiently locating an optically recognizable character encoded on a label, comprising machine-executed steps of:

locating the label;

searching in a first predetermined window for identifying a first predetermined object;

determining a first reference mark position on the first predetermined object;

searching in a second predetermined window for identifying a second predetermined object;

determining a second reference mark position on the second predetermined object;

calculating a first character window location relative to the first and second reference mark positions;

reading a first character located within the first character window; and if either searching step failed:

searching the first predetermined window for identifying a third predetermined object;

determining a third reference mark position on the third predetermined object;

searching the second predetermined window for identifying a fourth predetermined object;

determining a fourth reference mark position on the fourth predetermined object;

calculating the location of the first character window, the location being relative to the third and fourth reference mark positions; and reading the first character located within the first character window.

3. The method according to claim 2 further comprising the machine executed step of reporting a label as missing if no predetermined objects are identified.

4. A vision system for reading coded data on a label, wherein the time required to reach each one of the coded data is reduced by accurately predicting the location of each one of the coded data by first locating first and second references positioned on the label, said vision system comprising:

a processor;

a memory coupled to said processor;

a camera coupled to said processor;

wherein said processor comprises means for searching a first image window for identifying a first object, the first object being a first portion of the label;

means for searching a second image window for identifying a second object, the second object being a second portion of the label;

means for determining the first reference position on the first object and the second reference position on the second object;

means for predicting a first coded data window location, the location being relative to the first and second reference positions;

means for instructing said processor to read the coded data;

means for searching a third image window for identifying a third object if said camera failed to find the first or second object, the third object being a third portion of the label;

means for searching a fourth image window for identifying a fourth object, the fourth object being a fourth portion of the label;

means for determining a third reference position on the third object and a fourth reference position on the fourth object; and means for predicting the first coded data window location, the location being relative to the third and fourth reference positions.

5. The vision system according to claim 4 wherein said processor further comprises means for indicating that the label is missing if the processor fails to locate any of the objects.

6. The vision system according to claim 5 wherein the first coded data is an alpha-numeric character.

7. The vision system according to claim 5 wherein the first coded data is a bar code.

8. The vision system according to claim 5 wherein the label is a predetermined size and each of the coded data is located at a predetermined location.

9. A robotic vision system for reading coded data on a label, the label being attached to an article for identifying said article, wherein the time required to reach each one of the coded data on the label is reduced by accurately predicting the location of each one of the coded data on the label thereby reducing a size of each coded data search window, said robotic vision system comprising:

a processor;

a memory coupled to said processor;

a camera coupled to said processor;

wherein said processor comprises:

means for searching a first image window for identifying a first object, the first object being a top portion of the label;

means for searching a second image window for identifying a second object, the second object being a bottom portion of the label;

means for determining a first reference position on the first object and a second reference position on the second object;

means for predicting a first coded data window location for placing a first coded data window, the location being relative to the first and second reference positions;

means for reading a first coded data; and means for searching the first and second image windows for third and fourth objects, respectively, if the processor failed to identify the first or second objects, or if the processor failed to read the first coded data.

10. The robotic vision system according to claim 9 wherein the third and fourth objects are top and bottom corners, respectively, of the label.

11. The robotic vision system according to claim 10 wherein said processor further comprises means for indicating that the label is missing if the processor fails to locate the third and fourth objects.

12. The robotic vision system according to claim 9 wherein the first coded data is an alpha-numeric character.

13. The robotic vision system according to claim 9 wherein the first coded data is a bar code.

14. The robotic vision system according to claim 9 wherein the label is a predetermined size and each of the coded data is located at a predetermined location.

15. A subsystem for controlling a robotic vision system for reading coded data on a label, wherein the time required to read each one of the coded data on the label is reduced by accurately predicting the location of each one of the coded data on the label thereby reducing a size of each coded data search window, said subsystem comprising:
   storage means;
   a processor comprising:
   means for searching a first image window for identifying a first object, the first object being another portion of the label;
   means for searching a second image window for identifying a second object, the second object being another portion of the label;
   means for determining a first reference position on the first object and a second reference position on the second object;
   means for predicting a first coded data window location for placing a first coded data window, the location being relative to the first and second reference positions;
   means for reading the coded data within the first coded data window; and
   means for searching the first end second image windows for third and fourth objects, respectively, if the processor failed to identify the first or second objects, or if the processor failed to read the coded data.

16. The program product according to claim 15 wherein the third and fourth objects are top and bottom corners, respectively, of the label.

17. The program product according to claim 16 wherein said processor further comprises means for indicating that the label is missing if the processor fails to locate the third or fourth objects.

18. The program product according to claim 17 wherein the label is a predetermined size and each of the coded data is located at a predetermined location.

* * * * *

UNITED STATES PATENT AND TRADEMARK OFFICE
CERTIFICATE OF CORRECTION

PATENT NO. : 5,199,084
DATED : March 30, 1993
INVENTOR(S) : Gregory T. Kishi, Michael P. McIntosh It is certified that error appears in the above—identified patent and that said Letters Patent is hereby corrected as shown below:

Column 10, Claim 15, Line 13  end should read and.

Signed and Sealed this

Thirtieth Day of November, 1993

Attest:

BRUCE LEHMAN

Attesting Officer   Commissioner of Patents and Trademarks